United States Patent [19]

Gautier et al.

[11] Patent Number: 5,039,294

[45] Date of Patent: Aug. 13, 1991

[54] APPARATUS FOR COMPACTING POWDER

[75] Inventors: Jean Gautier, Vaucresson; Jean-Pierre Crepet, Villers Cotterets, both of France

[73] Assignee: L'Oreal, Paris, France

[21] Appl. No.: 357,721

[22] Filed: May 26, 1989

[30] Foreign Application Priority Data

May 31, 1988 [FR] France ............................... 88 07213

[51] Int. Cl.[5] ........................ B29C 43/58; B30B 15/16

[52] U.S. Cl. ................................... 425/149; 264/40.5; 264/120; 425/150; 425/157; 425/167; 425/170; 425/419; 425/420; 100/48

[58] Field of Search ............... 425/135, 149, 157, 167, 425/170, 419, 420, 150, 406, 412; 264/40.5, 109, 40.1, 120; 100/48, 50, 51

[56] References Cited

U.S. PATENT DOCUMENTS

| | | | |
|---|---|---|---|
| 2,573,141 | 10/1951 | Heinrich | 264/102 |
| 2,592,768 | 4/1952 | Van der Pyl | 425/149 |
| 2,724,145 | 11/1955 | Hall | 425/157 |
| 2,900,664 | 8/1959 | Hampel et al. | 425/110 |
| 3,044,389 | 7/1962 | Rexford | 425/167 |
| 3,825,386 | 7/1974 | Bello et al. | 425/135 |
| 4,000,231 | 12/1976 | Peterson | 425/149 |
| 4,317,649 | 3/1982 | Boellmann | 425/150 |
| 4,373,889 | 2/1983 | Brown | 425/150 |
| 4,588,539 | 5/1986 | Rossi et al. | 425/167 |
| 4,640,671 | 2/1987 | Wright | 425/149 |

FOREIGN PATENT DOCUMENTS

| | | | |
|---|---|---|---|
| 0130958 | 1/1985 | European Pat. Off. . | |
| 514429 | 12/1971 | Switzerland | 425/149 |
| 589863 | 7/1947 | United Kingdom . | |
| 1133199 | 11/1968 | United Kingdom . | |
| 1258051 | 12/1971 | United Kingdom . | |
| 1535356 | 12/1978 | United Kingdom . | |
| 2163383 | 2/1986 | United Kingdom . | |

OTHER PUBLICATIONS

Patent Abstracts of Japan, vol. 10, No. 383 (C-393) [2440], Dec. 23, 1986 & JP-S-61 176 515.

*Primary Examiner*—Jay H. Woo
*Assistant Examiner*—James P. Mackey
*Attorney, Agent, or Firm*—Cushman, Darby & Cushman

[57] ABSTRACT

An adjustable powder compacting device for compacting a powder such as a cosmetic powder includes a control unit which electrically monitors and controls a hydraulic ram operated punch to compress the powder into a cup. The control unit causes the punch to perform: an approach stroke with a first regulated preset punch speed until the punch contacts the powder and exerts a first pressure on it, a debubbling stroke with a regulated second preset punch speed until the pressure exerted by the punch reaches a second preset pressure, and a compacting stroke at a constant third preset pressure for a preset period of time. These preset speeds and pressures are easily adjusted so that proper evacuation of gases from the powder and optimal compacting is readily achievable when the consistency of the powder changes. In specific embodiments, the device includes a rotatable disc for causing successive volumes of non-compressed powder to be compressed by the punch. In other embodiments, the device includes a plotting board for displaying the operation of the device such as the speed and pressure of the punch.

17 Claims, 3 Drawing Sheets

APPARATUS FOR COMPACTING POWDER

BACKGROUND OF THE INVENTION

1. Field of the Invention

The invention relates to a method of and apparatus for compacting powder in which there is a dolly against which a cup is intended to bear, means for containing a sufficient volume of non-compacted powder above the cup, and a hydraulic ram capable of displacing a punch intended to effect the compacting of the powder in the cup; this punch effects an approach stroke during which the powder is not subjected to any compression, then a contact stage corresponding to the start of the compression of the powder, then a stroke termed a "debubbling" stroke, during which the air or other gas contained in the powder is ejected and at the end of which stroke the displacement of the punch is practically stopped but the pressure is maintained in the ram to ensure the compacting for an adequate period.

The invention concerns more particularly, but not exclusively, the compacting of cosmetic powder, because it is in this case that its application seems to be most advantageous.

2. Description of the Related Art

The compacting machines known to date, in particular for cosmetic powders, are not completely satisfactory, because the percentage of rejects during manufacture is relatively high. In particular, these rejects are the result of the formation of lumps in the cake of compacted powder, or the breakage of this cake or other defects rendering the product unsuitable for commercial use.

SUMMARY OF THE INVENTION

The aim of the present invention is primarily to provide a compacting apparatus and method of the kind defined above which would meet the various practical requirements better than heretofore and which make it possible, in particular, to improve substantially the quality of the compacted product and to reduce the production reject level.

It is particularly desirable for the apparatus to be very flexible in use, and to allow the operating parameters to be simply, rapidly and efficiently adapted to the characteristics of the powder being compacted.

According to one aspect of the invention, there is provided an apparatus for compacting powder, comprising: a dolly against which a cup is intended to bear; means for containing a sufficient volume of non-compacted powder above the cup; a fluid pressure-operated ram capable of displacing a punch intended to effect the compacting of the powder in the cup, this punch being drivable to effect an approach stroke during which the powder is not subjected to any compression, then a contact stage corresponding to the start of the compression of the powder, then a stroke termed a "debubbling" stroke during which air or other gas contained in the powder is ejected and at the end of which the displacement of the punch is subsequently practically stopped but the pressure in the ram is maintained to ensure the compacting for an adequate period; means capable of detecting the contact stage of the punch; means for setting a desired value for the speed of the punch during the "debubbling" stage; and regulating means for maintaining the speed of said punch during this "debubbling" stage substantially equal to the desired value, the operation of this regulating means being controlled by the above mentioned means capable of detecting the contact stage.

Trials undertaken have shown that the speed of the punch during the "debubbling" stage constitutes an important parameter which determines the proper evacuation of the air or gases contained in the powder. The present invention allows this parameter to be controlled, and adjusted to the value most suitable for the powder to be compacted, to reduce the production rejects to a minimum.

The means for detecting the contact stage can comprise a pressure transducer provided on the ram, capable of detecting the increase in pressure in the ram corresponding to the end of the approach stroke of the punch and to the start of the "debubbling" stroke.

The pressure transducer is capable of supplying an electric signal which is passed to the input of a comparator which receives on another input an electric reference signal established by means of an adjusting potentiometer, the output of the comparator being capable of actuating the closing of a contact for the operation of the means for regulating the speed of the punch.

Preferably, the setting of the desired speed of the punch, and hence the piston rod of the ram, during the "debubbling" stage is effected by means of a potentiometer which supplies on its output an electric reference signal passed to an input of a comparator, whilst means responsive to the speed of displacement of this punch are capable of producing an electric signal passed, after possible processing, to another input of the same comparator, the output of this comparator controlling a servo-valve for the feeding of pressure fluid to the ram.

The means responsive to the speed of displacement of the piston may be a volumeter mounted on the discharge of the ram and detecting the throughput of pressure fluid delivered by the piston during the displacement of the punch.

Preferably, the application comprises means for indicating a compacting pressure and means for maintaining this compacting pressure during a specified period once it has been reached.

The means for setting the compacting pressure can comprise a potentiometer capable of supplying an electric reference signal passed to an input of a comparator whose other input receives an electric signal coming from the pressure transducer or an equivalent transducer, the output signal of the comparator being used to control a servo-limiter determining the pressure in the ram.

The means for maintaining the compacting pressure can comprise an adjustable timing circuit capable of controlling the resetting to zero and the return of the ram to its initial position when the compacting pressure has been maintained for a predetermined period.

The apparatus can also comprise means for setting a pressure, at the end of "debubbling", lower than the compacting pressure, and means for controlling the practically immediate attainment of the compacting pressure once the end pressure of the "debubbling" stage has been reached. The means for setting this end pressure of the "debubbling" stage can comprise a potentiometer supplying an electric output signal passed to an input of a comparator whose other input receives a signal corresponding to the pressure in the ram, the output of this comparator controlling the closing of a contact capable of actuating the servo-feed valve of the ram in a direction ensuring that the ram is completely fed.

Provision can also be made for means to allow the approach speed of the punch before the contact stage to be set.

It is clear that sensors other than those mentioned could be used. In particular, a sensor for detecting the linear displacement from the emergent rod of the ram, (an inductive sensor or potentiometer sensor) could be used to determine the speed of the punch instead of a volumeter. A force transducer could be provided on the dolly instead of the pressure transducer provided for the ram.

The apparatus can be controlled manually or preferably automatically.

Provision can be made for a rotatable disc comprising several compartments intended to receive capsules in combination with the fixed dolly and to be driven in rotation by an electric motor, in particular a stepper motor. The rotation of the motor moves the next capsule to be below the punch. This rotation is actuated when a complete compacting cycle has ended.

The ram may be hydraulic.

Another aspect of the present invention provides a method for compacting a powder by means of a punch, wherein the punch is caused to be displaced during the "debubbling" stage at a substantially constant predetermined speed.

Preferably, an end of "debubbling" pressure is set and, when this pressure is reached, one rapidly passes to a pre-set compacting pressure which is maintained for a predetermined period.

Provision can be made for means for obtaining a decompression, adjustable with respect to time and pressure, at the end of the compacting stage.

BRIEF DESCRIPTION OF THE DRAWINGS

Apart from the features set cut above, the invention embraces various other characteristics which will be discussed in greater detail below in connection with a particular embodiment described with reference to the accompanying drawings, but which is in no way restrictive. In these drawings.

DETAILED DESCRIPTION OF THE PREFERRED EMBODIMENTS

Figure 1:
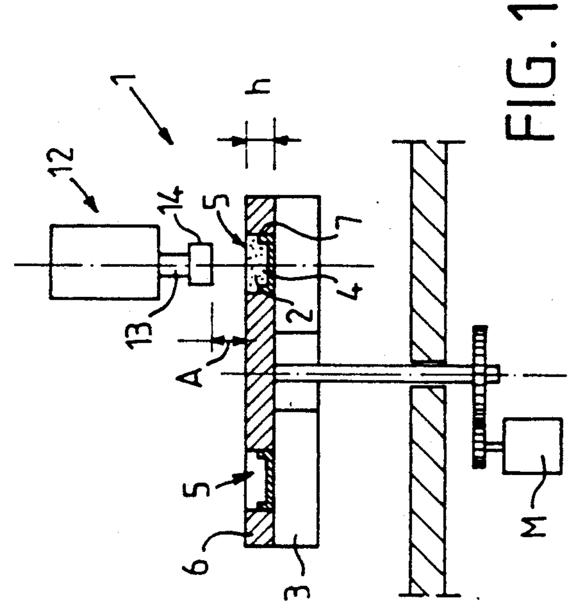
FIG. 1 is a schematic elevational view of a compacting apparatus in accordance with the invention.
Figure 2:
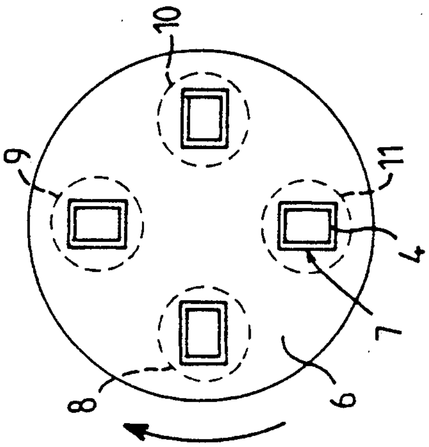
FIG. 2 is a plan view of the apparatus of FIG. 1.

Referring now to the drawings, FIGS. 1 and 2 show a machine 1 for the compacting of a powder 2, in particular a cosmetic powder. This machine comprises a dolly 3, against which there is intended to bear a cup 4 and means 5 for containing a sufficient volume of non-compacted powder above the cup.

In this embodiment there is a rotary disc 6 above the dolly, this disc comprising, for example, four compartments 7 at 90° intervals as may be seen in FIG. 2. Each compartment 7 is capable of receiving a cup 4 and has a shape adapted to this cup. The compartment 7 is a bore through the disc 6 so that, during compacting, the cup can bear against the dolly 3. The means 5 referred to above are constituted by the compartment 7 whose height h exceeds that of the cup 4 and the volume of the compartment 7 is thus adequate to contain a sufficient quantity of non-compacted powder to fill the cup 4 after compacting.

The disc 6 rotates stepwise, effecting in each step a clockwise rotation of 90° as viewed in FIG. 2, so that the compartments 7 pass in turn to the station 8 for the insertion of the cup, then to the station 9 for the insertion of the non-compacted powder, then to the compacting station 10 and finally to the station 11 for the ejection of the cup.

The machine comprises a hydraulic ram 12, situated above the compacting station with its axis vertical, the disc 6 being horizontal. The cylinder of the ram 12 is fixed in relation to the dolly 3, while the piston of this ram comprises a rod 13 projecting outwardly towards the disc 6; a punch 14 is mounted at the end of this rod 13 to effect the compacting of the powder 2 in the cup 4. The cross-section of the punch corresponds to that of the compartment 7 so as to enter into this compartment with minimum clearance. For the compacting operation, a woven fabric, not represented in the drawings, may be provided between the powder 2 and the punch 14.

In FIG. 1, the compacting stroke of the rod 13 of the ram is in a vertically downward direction.

A reverse arrangement could be adopted in which the dolly 3 would be disposed above the disc 6 while the punch 14 would be engaged upwardly from below against the cup 4. In this case, this cup would bear indirectly against the dolly via the powder 2 which would be compacted between the dolly and the cup.

In the rest position of the ram 12, the punch 14 is separated from the disc 6. Because of this, the punch 14 effects an approach stroke of amplitude A, during which the powder 2 is not subjected to any compression. There is then a contact stage corresponding to the start of the compression of the powder 2. In FIG. 1, this contact stage takes place when the punch 14 comes into contact with the powder 2 for the above visualized reverse arrangement wherein the punch stroke is upward from below, the contact stage would correspond to the punch coming into contact with the bottom of the cup.

The punch 14 then effects a stroke termed a "debubbling" stroke during which air or other gas contained in the powder 2 is ejected therefrom.

The displacement of the punch 14 is then practically stopped at the end of the "debubbling" stage, but the pressure is maintained in the ram 12 to ensure a sufficiently long compacting action.

Figure 3:
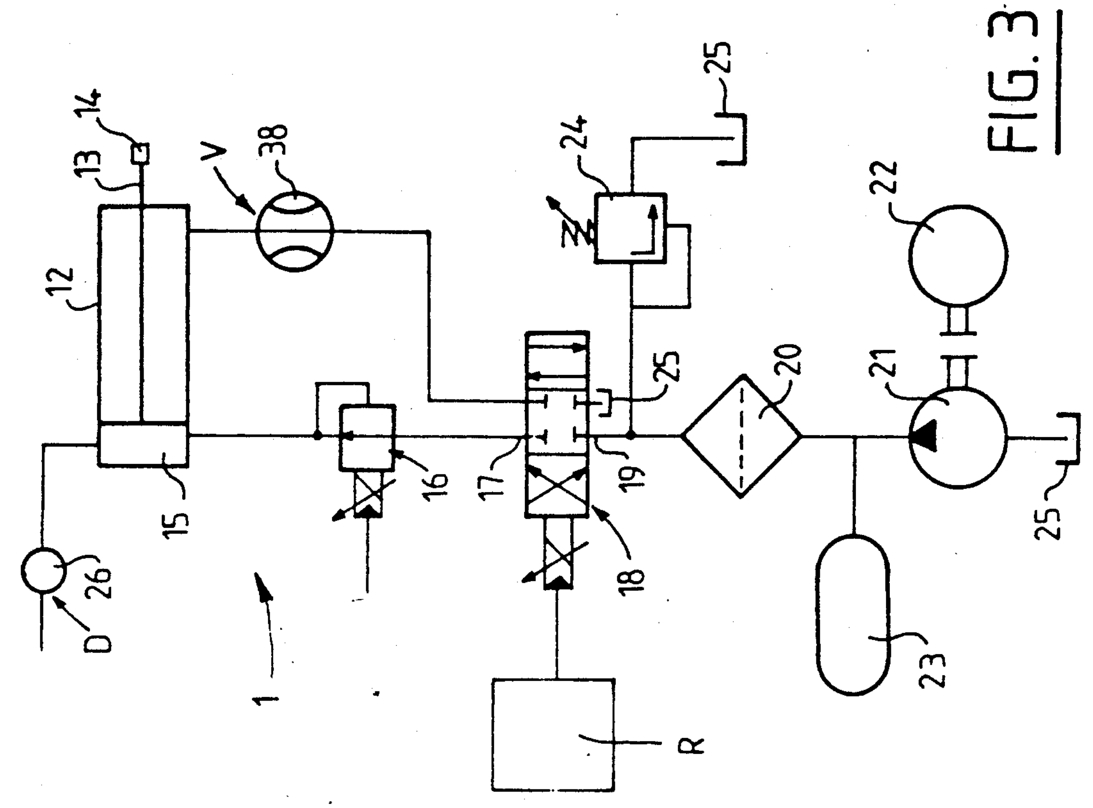
FIG. 3 is a hydraulic circuit diagram of an apparatus in accordance with the invention.

As may be seen in FIG. 3, the ram 12 is of the double action type. The larger cross-section chamber, which is not traversed by the rod 13, receives pressurized liquid coming from a servo-limiter 16 whose input is connected to an output 17 of a servo-valve 18 with a three position distributor. The input 19 of the servo-valve is connected via a filter 20 to the delivery output of a hydraulic pump 21 having a fixed piston displacement. For example, the pump 21 may be a vane pump, a piston pump or a gear pump, driven by a motor 22, preferably an electric motor.

An oil/air pressure accumulator 23 is connected to the delivery duct of the pump 21.

A calibrated valve 24 is provided between the duct connected to the input 19 of the servo-valve 18 and the hydraulic liquid reservoir or vessel 25.

Figure 4:
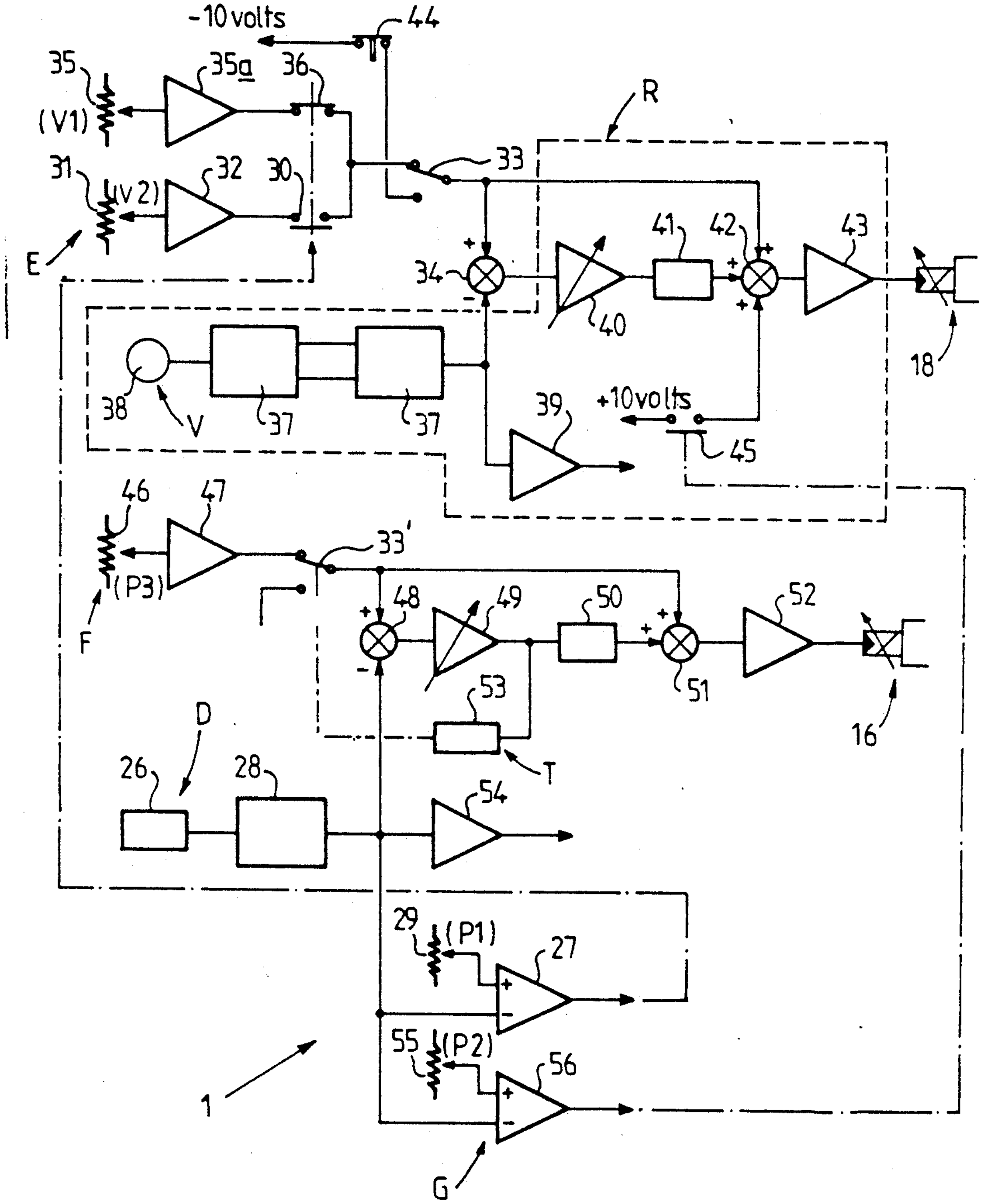
FIG. 4 is an electric circuit diagram of the apparatus of FIG. 3.

The machine comprises means D (FIG. 3) capable of detecting a contact stage of the punch 14. In this example, as shown in FIGS. 3 and 4, these means D comprise a pressure transducer 26 connected to detect the pressure in the chamber 15. Other solutions are possible. For example, there could be a force transducer below the cup 4 between it and the dolly 3.

The pressure transducer 26 is capable of supplying at its output, an electric signal which is passed to the input of a comparator 27. Preferably, as shown in FIG. 4, the electric signal supplied by the transducer 26 is first of all shaped by a processing circuit 28 before passing to the input of the comparator 27. The comparator receives on another input an electric reference signal from an adjustable potentiometer 29 which determines the contact stage threshold. The end terminals of the potentiometer 29 are connected across a constant potential difference. The reference signal is collected at the adjustable sliding contact.

When the signal from the transducer 26 exceeds that from the sliding contact of the potentiometer 29, the output of the comparator 27 changes and actuates closing of a make contact 30 (FIG. 4) for bringing into operation means R for regulating the speed of the punch 14.

There are means E (FIG. 4) for setting a desired value for the speed of the punch 14 during the "debubbling" stage. Preferably, these means E comprise a potentiometer 31 (FIG. 4) whose end terminals are connected across a constant potential difference, and whose adjustable sliding contact delivers an electric signal which constitutes a reference value. The sliding contact of this potentiometer 31 is connected via an amplifier 32 to a terminal of a pair of contacts 30. The other terminal of these contacts 30 (FIG. 4) is connected to the "ON" terminal of a switch 33; the common terminal of this switch 33 is connected to an input of a comparator 34.

Advantageously a reference value, for the speed of descent of the punch 14 before the contact stage, can be established by a potentiometer 35 whose sliding contact is connected via an amplifier **35*a* to rest contacts 36 actuated simultaneously with the make contacts 30. These rest contacts 36 are connected via their outlet terminal to the "ON" terminal of the switch 33**.

During the descent of the punch, the contacts 36 are closed and the contacts 30 open, whilst at the time of the contact stage the opening of the contacts 36 and simultaneous closing of the contacts 30 are actuated.

The regulating means R comprise means V (FIGS. 3 and 4) responsive to the speed of displacement of the punch 14 and hence of the piston rod of the ram 13. These means V are capable of producing an electric signal which is passed, after processing and shaping in the circuits 37, to another input of the comparator 34.

The means V can be constituted by a volumeter 38 mounted on the discharge duct of the ram 12 (FIG. 3) and detecting the throughput of the liquid delivered by the ram piston on displacement of the punch 14.

It is obvious that other solutions are possible for the means V; for example, it may be a sensor detecting the linear displacement of the emergent piston rod 13 of the ram 12, this sensor being of the inductive or potentiometer type.

Figure 6:
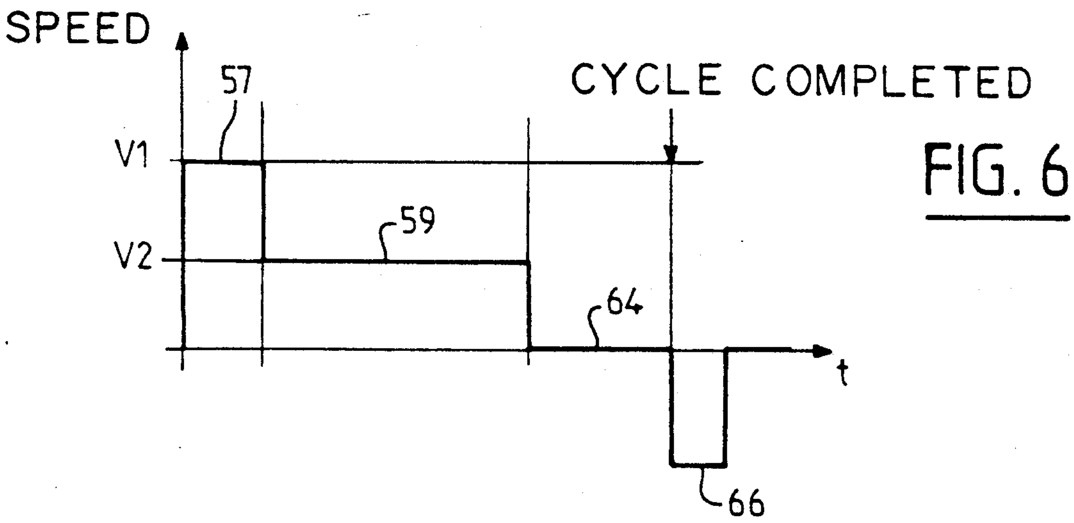
FIG. 6 is a diagram representing the speed of the punch plotted on the y axis in relation to the time plotted on the x axis.

The electric signal supplied by the volumeter 38 can also be passed in parallel via an amplifier 39 to a plotting board input (not shown) for visualizing the variation of the throughput, and hence the speed of the punch 14, to be plotted on the y axis in relation to the time plotted on the x axis (see the graph of FIG. 6).

The output signal of this comparator 34 is amplified by an adjustable amplifier 40 shaped by a circuit 41 and transmitted via a comparator 42 to the input of a power amplifier 43 capable of controlling the electromagnetic control winding for the servo-valve 18.

The comparator 42 comprises another input connected to the common terminal of the switch 33. The common terminal is a "STOP" terminal connected via a contact 44, for the top end of travel of the rod 13, to a negative potential, for example (−10 volts).

When the switch 33 is placed into the "STOP" (or "RETURN") position, the negative potential applied at the input of the comparator 42 causes the servo-valve 18 to pass into a condition ensuring return of the piston and piston rod of the ram 12 into the high position. The opening of the end of travel contact 44 actuates the stopping of the return stroke, the distributor of the servo-valve 18 being placed into the neutral position of FIG. 3, where the two chambers of the ram 12 are isolated from the pressure source and from the reservoir.

Another input of the comparator 42 is connected via contacts 45, which are open in the "rest" position, to a positive potential, for example +10 volts. The closing of the contact 45 is actuated by a relay which is excited, as will be explained below, at the end of the "debubbling" stage. The closing of the contacts 45 produces at the output of the comparator 42 a signal actuating the servo-valve 18 to pass into a condition which ensures that the chamber 15 of the ram is supplied with pressurised liquid.

The machine 1 also comprises means F for selecting a compacting pressure and means T for maintaining this compacting pressure for a specified time once attained.

The means F for setting the compacting pressure advantageously comprise a potentiometer 46 whose ends are connected across a constant potential difference, and whose adjustable slider makes it possible to obtain an electric reference signal representing a compacting pressure. This reference signal is passed through an amplifier 47 to an input of a comparator 48 via another "ON" contact of a switch 33'. The rocking of this switch 33' causes its contacts to pass to the "STOP" position which ensures resetting to zero.

Another input of the comparator 48 is connected to the output of the circuit 28 so as to receive an electric signal representing the actual value of the pressure detected by the transducer 26.

The output signal of the comparator 48 actuates the servo-limiter 16 by acting on an electromagnetic control winding, so as to increase the pressure authorized by the servo-limiter 16 if the actual pressure is less than the desired pressure, and to reduce this pressure authorized by the servo-limiter 16 in the opposite case.

The output signal of the comparator 48 is passed to the input of an adjustable amplifier 49 whose output is connected to a shaping circuit 50. The output of this circuit 50 is connected to an input of a comparator 51 whose output is connected to a power amplifier 52. The output of this amplifier acts on the control winding of the servo-limiter 16.

An adjustable timing circuit 53 comprises a detection input connected to the output of the amplifier 49 and to the input of the circuit 50. The timing circuit 53 is capable of actuating the passing of the switch 33' from the "ON" position to the "STOP" position, and the resetting to zero at the end of an adjustable predetermined period so that the compacting pressure should only be maintained during this predetermined period.

Figure 7:
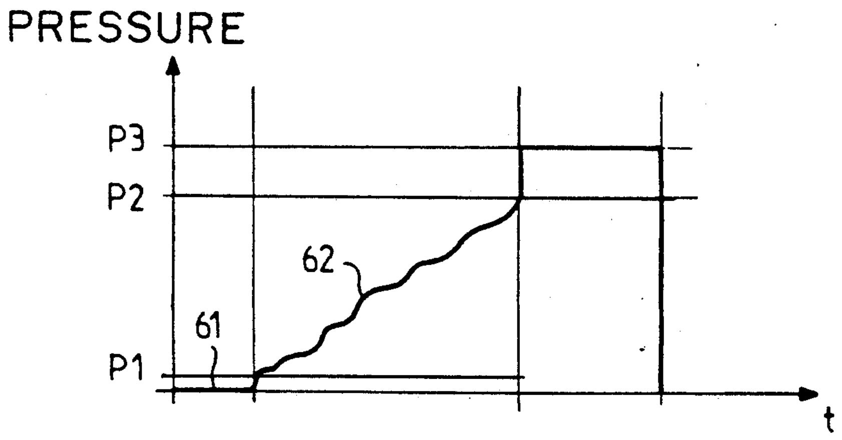
FIG. 7 is a diagram representing the pressure variations in the ram, and on the punch, plotted on the y axis in relation to the time plotted on the x axis.

The output of the circuit 28 can be also connected via an amplifier 54 to the input of a plotting board, making it possible for the variations of pressure in the chamber 15, plotted on the y axis, to be represented in relation to the time plotted on the x axis (see FIG. 7).

Provision is made for means G to make it possible, if desired, to set an end of "debubbling" pressure which is lower than the compacting pressure. These means G preferably comprise a potentiometer 55 whose ends are connected across a constant potential difference and whose adjustable slider is connected to an input signal from the circuit 28 coming from the pressure transducer 26.

When the electric signal representing the actual pressure exceeds the reference value set by the slider of the potentiometer 55, the output of the comparator 56 changes and actuates the closing of the contact 45 which causes the servo-valve 18 to pass into a position for the full admission of the pressurised fluid into the chamber 15. The pressure in the ram 12 rapidly passes to the value of the compacting pressure set by the potentiometer 46.

A regulated power supply, now shown, powered from the alternating current of the mains may supply the various electronic circuits, amplifiers, comparators etc. with a direct current, for example, at a voltage of +15 volts or −15 volts.

This being the case, the operation of the machine in accordance with the invention is as follows.

The starting position is where the switch 33 is in the "STOP" position and the rod 13 occupies its high position. A cup 4, as represented in FIG. 1, is situated below the punch 14; a sufficient quantity of non-compacted powder 2 is located in the compartment 7.

Figure 5:
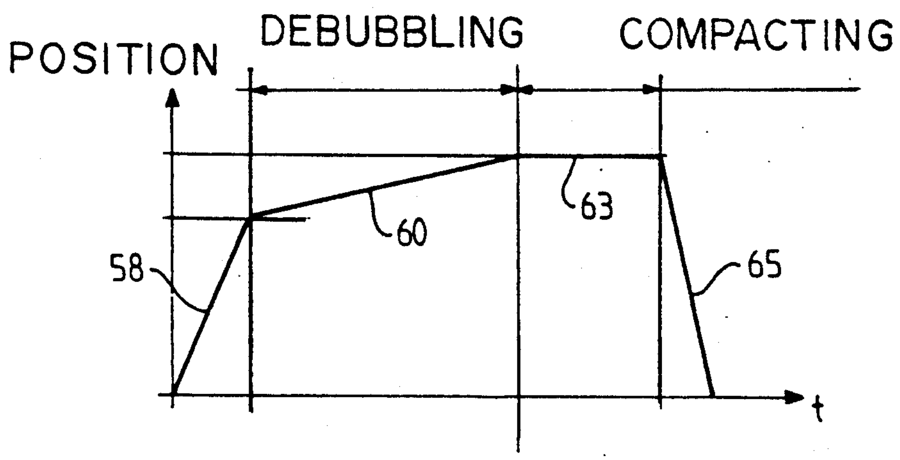
FIG. 5 is a diagram illustrating the displacements of the piston plotted on the y axis in relation to the time plotted on the x axis.

The start of a compacting cycle is obtained by causing the switch 33 to pass into the "ON" position. The contact 36 is closed while the contact 30 is open. The punch 14 and the rod 13 of the ram will descend at a speed corresponding to that set by the potentiometer 35. In FIG. 6 this stage corresponds to the segment 57, parallel to the x axis, and to a constant descending speed V1. In FIG. 5, the corresponding segment is designated by 58 which corresponds to a segment of a straight line with a positive gradient.

It should be noted that the level of the segment 57 and hence the slope of the segment 58 can be adjusted by acting on the slider of the potentiometer 35.

When the punch 14 comes into contact with the powder 2, which corresponds to the contact stage, the pressure in the chamber 15 of the ram 12 increases. This pressure variation is detected by the transducer 26 and, when the threshold Pl (FIG. 7) is exceeded, it changes the output of the comparator 27 to energize a coil controlling the contacts 30 and 36 so that the contacts 30 close while the contacts 36 open.

The speed of descent of the punch 14 will be established at a value corresponding to the setting of the potentiometer 31.

This speed V2 (see FIG. 6) corresponds to the "debubbling" speed and is kept constant, which gives the segment 59 in FIG. 6. This speed V2 is generally lower than the descent speed V1.

In FIG. 5, the corresponding segment is designated by 60 which is a segment of a straight line whose slope is less steep than that of the segment 58.

The variation of the pressure in the chamber 15, with respect to time, is represented in FIG. 7. During the descent, which corresponds to the segment 61, the pressure in the chamber 15 is low, practically zero. Pl corresponds to the contact stage threshold established with the potentiometer 29. During the "debubbling" stage, the pressure develops according to the segment of the curve 62 in accordance with the responses to the regulation to ensure that the "debubbling" speed remains substantially constant.

When the pressure reaches the value P2, corresponding to the pressure at the end of the "debubbling", set by the slider of the potentiometer 55, the output of the comparator 56 changes and actuates the closing of the contacts 45.

Because of this, the servo-valve 18 passes into a position ensuring that the chamber 15 is completely filled with the pressurised fluid. This results in a practically instantaneous increase in pressure in the chamber 15, with passing of the pressure value P2 to the pressure value P3 (FIG. 7) which is the compacting pressure set by the slider of the potentiometer 46.

The regulating means maintain the compacting pressure at this value P3 for the predetermined period sanctioned by the timing circuit 53. During this compacting stage, the displacement of the punch 14 is practically zero, hence the segment 63 in FIG. 5 is parallel to the x axis; the speed of the punch 14 is also zero giving the segment 64 of FIG. 6.

On termination of the compacting period, the circuit 53 causes the switch 33' to change to the "STOP" position so that the rod 13 and the punch 14 are caused to rise again, which corresponds to the segment 65 of FIG. 5 and to the segment 66 (speed in the opposite direction) of FIG. 6.

When the rod 13 arrives in the high position, the end of travel contacts 44 are opened and the rod 13 is stopped. The cycle is completed. The control means then starts motor M (FIG. 1) driving the disc 6 so that it indexes one step and brings a new cup under the punch 14 for the compacting.

The actuation of the disc 6 can be effected manually by operating a push button acting on the switch 33'. It is, also of course, possible to provide for an automatic control with a phase by phase sequence of the cycle, or by automation by means of a programmable automatic device which may or may not be connected to a computer.

The machine in accordance with the invention makes it possible to control and regulate the various parameters, in particular the "debubbling" speed, the pressure of compacting and the duration of compacting, in spite of internal leakages in the ram. The parameters set are reestablished during each cycle.

We claim:

1. An apparatus for compacting a volume of non-compressed cosmetic powder, comprising:

a dolly with a pressing surface;

hydraulic ram means for moving a punch from an initial position toward the pressing surface thereby compressing said volume of non-compressed powder;

speed detecting means for detecting the speed with which the punch moves and for outputting a signal indicative thereof;

pressure detecting means for detecting the pressure exerted by the punch and for outputting a signal indicative thereof; and a control means for controlling the hydraulic ram means, the control means responsive to the signal output from said speed detecting means and the signal output from said pressure detecting means, the control means comprising a means for setting a first preset speed, a second preset speed, a first preset pressure, a second preset pressure, and a third preset pressure, the control means also being for:

in an approach step, causing the hydraulic ram means to move the punch towards the pressing surface at the first preset speed until the signal output from the pressure detecting means indicates that the pressure exerted by the punch is at the first preset pressure;

in a debubbling step, causing the hydraulic ram means to move the punch towards the pressing surface at the second preset speed until the signal output from the pressure detecting means indicates that the pressure exerted by the punch is at the second preset pressure; and in a compacting step, causing the hydraulic ram means to press the punch toward the pressing surface for a preset amount of time so that the signal output from the pressure detecting means indicates the pressure exerted by the punch is constant at the third preset pressure throughout said preset amount of time.

2. The apparatus of claim 1, wherein said hydraulic ram means comprises a rod to which the punch is attached, wherein said speed detecting means comprises a linear displacement sensor located on the rod.

3. The apparatus of claim 1, wherein said means for setting said first preset speed includes potentiometer means for adjusting said first preset speed.

4. The apparatus of claim 1, wherein said means for setting said second preset speed includes potentiometer means for adjusting said second preset speed.

5. The apparatus of claim 1, wherein said means for setting said first preset pressure includes potentiometer means for adjusting said first preset pressure.

6. The apparatus of claim 1, wherein said means for setting said second preset pressure includes potentiometer means for adjusting said second preset pressure.

7. The apparatus of claim 1, wherein said means for setting said third preset pressure includes potentiometer means for adjusting said third preset pressure.

8. The apparatus of claim 1, wherein said control means also comprises:

a contact detecting means for outputting a signal indicative of whether the pressure exerted by the punch as indicated by the output of the pressure detecting means is above said first preset pressure, the contact detecting means comprising said means for setting said first preset pressure; and an end-of-debubbling step detecting means for outputting a signal indicative of whether the pressure exerted by the punch as indicated by the output of the pressure detecting means is above said second preset pressure, the end-of-debubbling step detecting means comprising said means for setting said second preset pressure.

9. The apparatus of claim 8, wherein said apparatus includes an electrically operated servo-valve for controlling operation of said hydraulic ram means, said servo-valve being controlled by said control means, wherein said control means also comprises:

a speed regulating means for regulating the speed of movement of the punch by outputting a controlled electrical output signal to said servo-valve, the controlled output signal being based on a comparison of the signal output from the speed detecting means with the first preset speed when the output of the contact detecting means indicates that the pressure exerted by the punch is below said first preset pressure, the controlled output signal being based on a comparison of the signal output from the speed detecting means with the second preset speed when the output of the contact detecting means indicates that the pressure exerted by the punch is above said first preset pressure, the speed regulating means outputting an electrical output signal to said servo-valve which causes the pressure exerted by the punch as indicated by the signal output of the pressure detecting means to increase from said second preset pressure to said third preset pressure.

10. The apparatus of claim 1, wherein said hydraulic ram means has an electrically operated servo-valve limiter wherein said control means also comprises:

a pressure limiting means for limiting the pressure exerted by the punch, the pressure limiting means comparing the signal output from the pressure detecting means with the third preset pressure and outputting an electrical output signal to the servo-valve limiter of the hydraulic ram means so that the pressure exerted by the punch as indicated by the pressure detecting means does not exceed the third preset pressure.

11. The apparatus of claim 10, wherein hydraulic ram means is also for moving said punch to said initial position, said pressure limiting means of said control means further comprising:

an adjustable timing circuit for timing said preset amount of time that the hydraulic ram means presses the punch toward the pressing surface at said third preset pressure, the timing circuit causing the hydraulic ram means to move the punch back to the said initial position after said present amount of time.

12. The apparatus of claim 1, further comprising a rotary disc having several compartments, each of said compartments being adapted to receive a cup in combination with said pressing surface of said dolly, said rotary disc being rotated by an electric motor such that each successive compartment is moved into a position with respect to the hydraulic ram means so that said punch compresses a volume of non-compressed powder into a cup in said each successive compartment.

13. The apparatus of claim 12, wherein said electric motor is a stepper motor.

14. The apparatus of claim 1, wherein said control means is also for:

in a decompression step after said compacting step, causing the punch to exert a fourth preset pressure for a second preset amount of time, and then causing the punch to move back to the said initial position.

15. The apparatus of claim 1 further comprising a plotting board means which is controlled by the control means for displaying the speed with which the punch moves versus time.

16. The apparatus of claim 1 further comprising a plotting board means which is controlled by the control means for displaying the pressure exerted by the punch versus time.

17. An apparatus for compacting non-compressed cosmetic powder, comprising:

a dolly with a pressing surface;

hydraulic ram means for moving a punch from an initial position toward the pressing surface, said hydraulic ram means comprising a piston and a cylinder containing a volume of hydraulic fluid, the hydraulic fluid having a hydraulic pressure, changes in the volume of hydraulic fluid in the cylinder resulting in corresponding movements of the punch;

speed detecting means for detecting the speed with which the punch moves and for outputting a signal indicative thereof, said speed detecting means comprising a volumeter which detects said changes in the volume of hydraulic fluid in the cylinder;

pressure detecting means for detecting a pressure exerted by the punch and for outputting a signal indicative thereof, said pressure detecting means comprising a pressure transducer which detects said hydraulic pressure; and a control means for controlling the hydraulic ram means, the control means responsive to the signal output from said speed detecting means and the signal output from said pressure detecting means, the control means comprising a means for setting a first preset speed, a second preset speed, a first preset pressure, a second preset pressure, and a third preset pressure, the control means also being for:

in an approach step, causing the hydraulic ram means to move the punch towards the pressing surface at the first preset speed until the signal output from the pressure detecting means indicates that the pressure exerted by the punch is at the first preset pressure;

in a debubbling step, causing the hydraulic ram means to move the punch towards the pressing surface at the second preset speed until the signal output from the pressure detecting means indicates that the pressure exerted by the punch is at the second preset pressure; and in a compacting step, causing the hydraulic ram means to press the punch toward the pressing surface for a preset amount of time so that the signal output from the pressure detecting means indicates the pressure exerted by the punch is constant at the third preset pressure throughout said preset amount of time.

* * * * *